United States Patent [19]
Bricaud et al.

[11] Patent Number: 5,775,949
[45] Date of Patent: Jul. 7, 1998

[54] COMPACT SMART CARD RECEIVER

[75] Inventors: Herve Guy Bricaud; Yves Pizard, both of Dole, France

[73] Assignee: ITT Composants et Instruments, Bagneux, France

[21] Appl. No.: 687,846

[22] Filed: Jul. 26, 1996

[30] Foreign Application Priority Data

Jul. 28, 1995 [FR] France ................... 95 09207

[51] Int. Cl.⁶ .................................... H01R 23/70
[52] U.S. Cl. ............................ 439/630; 439/567
[58] Field of Search ................ 439/630, 60, 260, 439/567, 521, 66

[56] References Cited

U.S. PATENT DOCUMENTS

| | | | |
|---|---|---|---|
| 4,902,233 | 2/1990 | Maillot | 439/630 |
| 4,961,710 | 10/1990 | Komatsu | 439/260 |
| 5,520,551 | 5/1996 | Broschard, III | 439/567 |
| 5,586,890 | 12/1996 | Braun | 439/630 |

FOREIGN PATENT DOCUMENTS

| | | |
|---|---|---|
| 0231409 | 2/1986 | European Pat. Off. |
| 0366513 | 10/1989 | European Pat. Off. |
| 2492213 | 10/1980 | France |
| 2607291 | 11/1986 | France |

*Primary Examiner*—Gary F. Paumen
*Assistant Examiner*—Tho D. Ta
*Attorney, Agent, or Firm*—Freilich Hornbaker Rosen

[57] ABSTRACT

The invention provides a receiver for a smart card (C) that has contact pads (P), including a printed circuit board (10), an electrical connector (14) mounted on the circuit board and holding contacts (18) for engaging the contact pads on the card, and a molded plastic cover (30) mounted on the circuit board and lying around the connector. The cover forms a card-receiving slot (38) for receiving a card in a fully-installed card position (A), including upper and lower slot walls (32, 44) that extend laterally (Q) across the entire width of the slot only at the front of the slot, with short runners (56, 58) extending along the opposite sides of the card along most of the slot length. The lower slot wall has a rear edge (46) that lies over a depressed front end of the body to closely position the cover with respect to the connector.

8 Claims, 5 Drawing Sheets

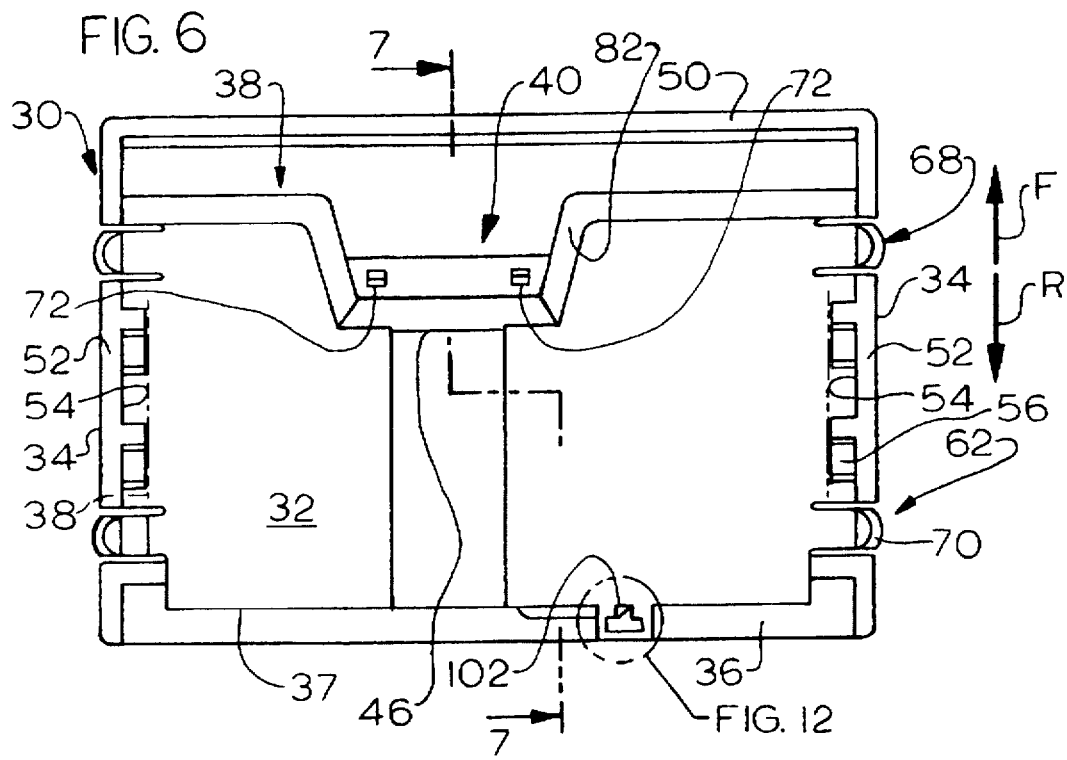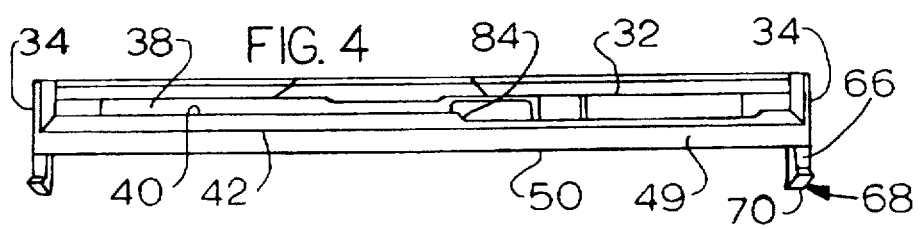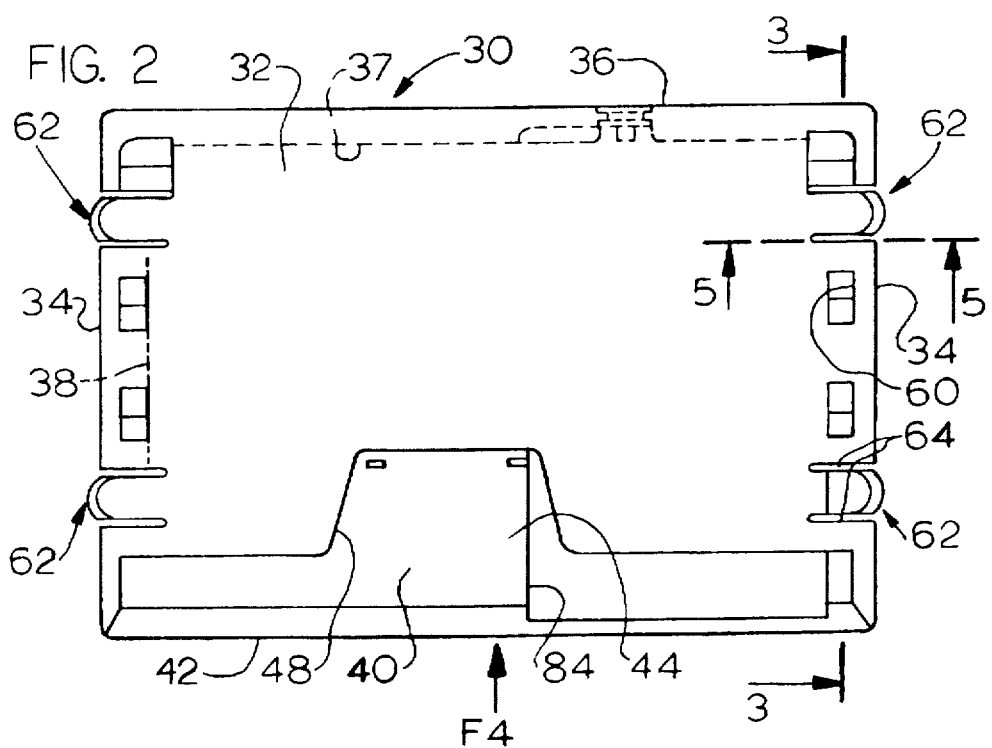

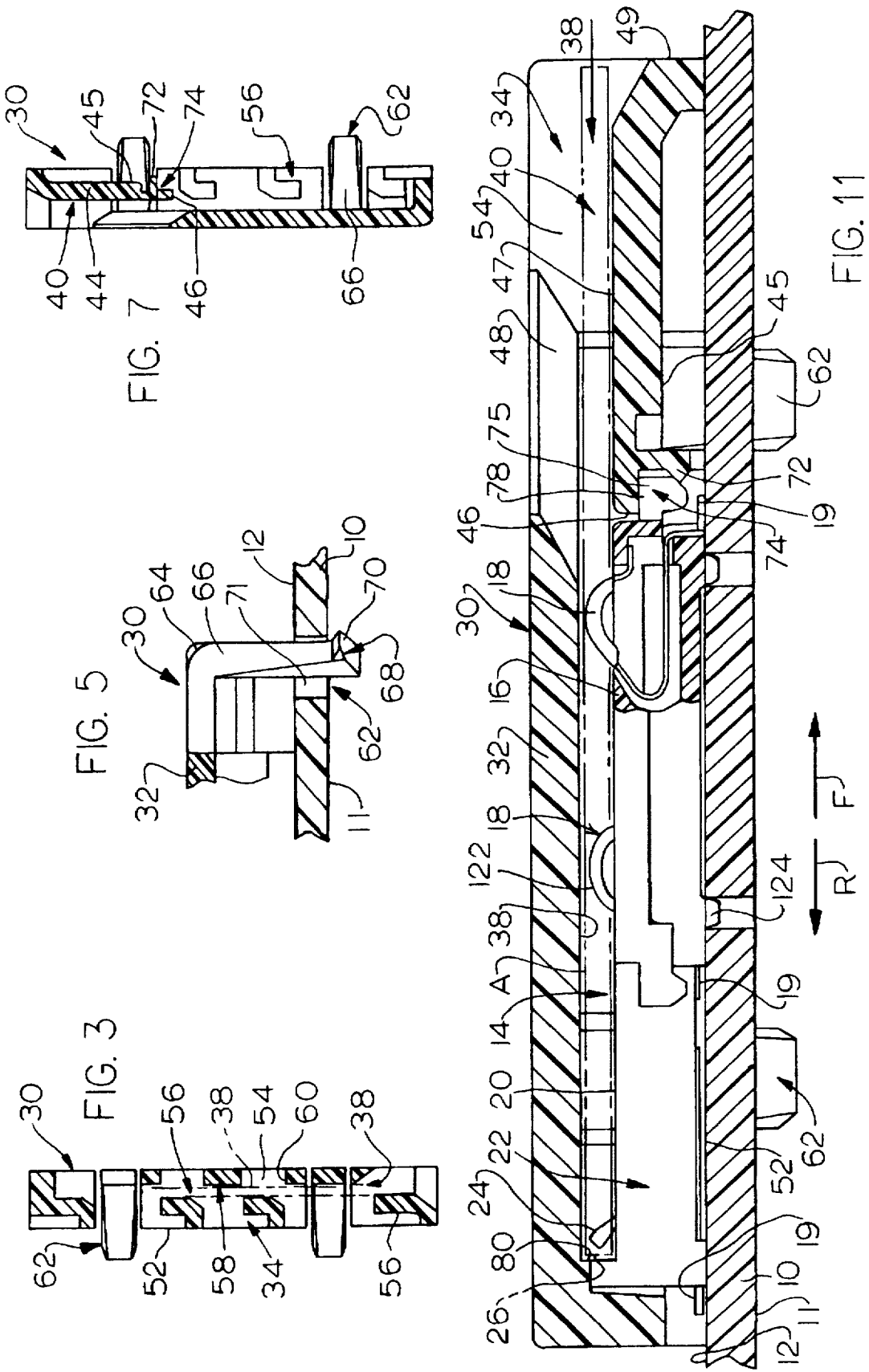

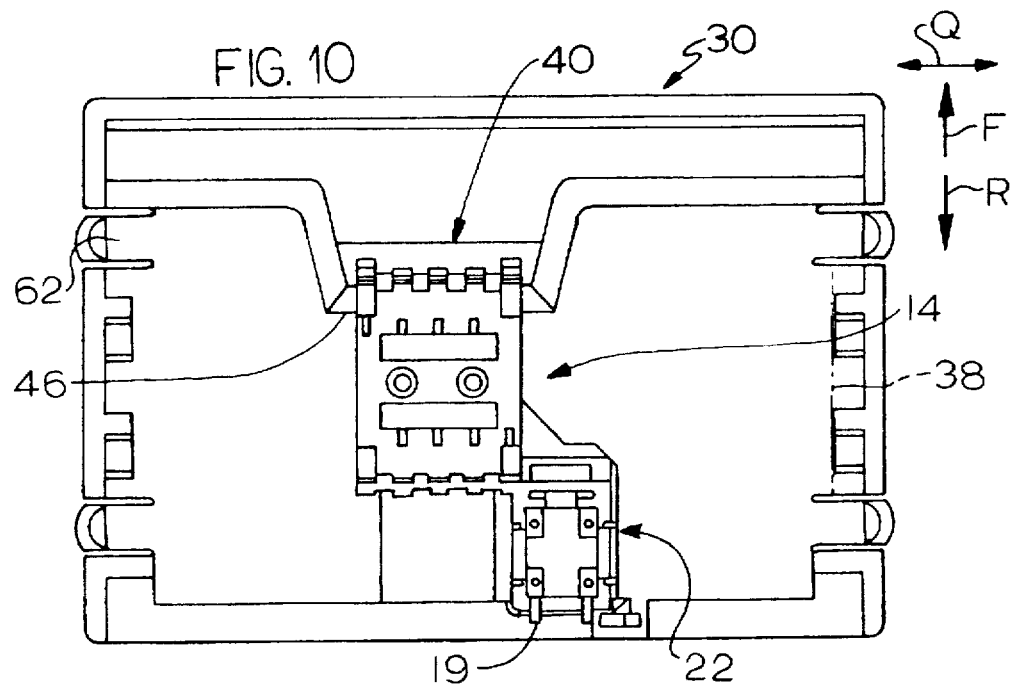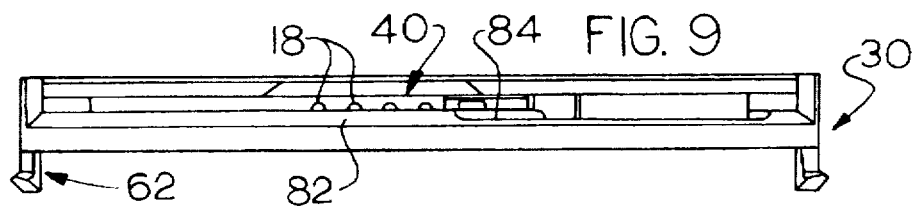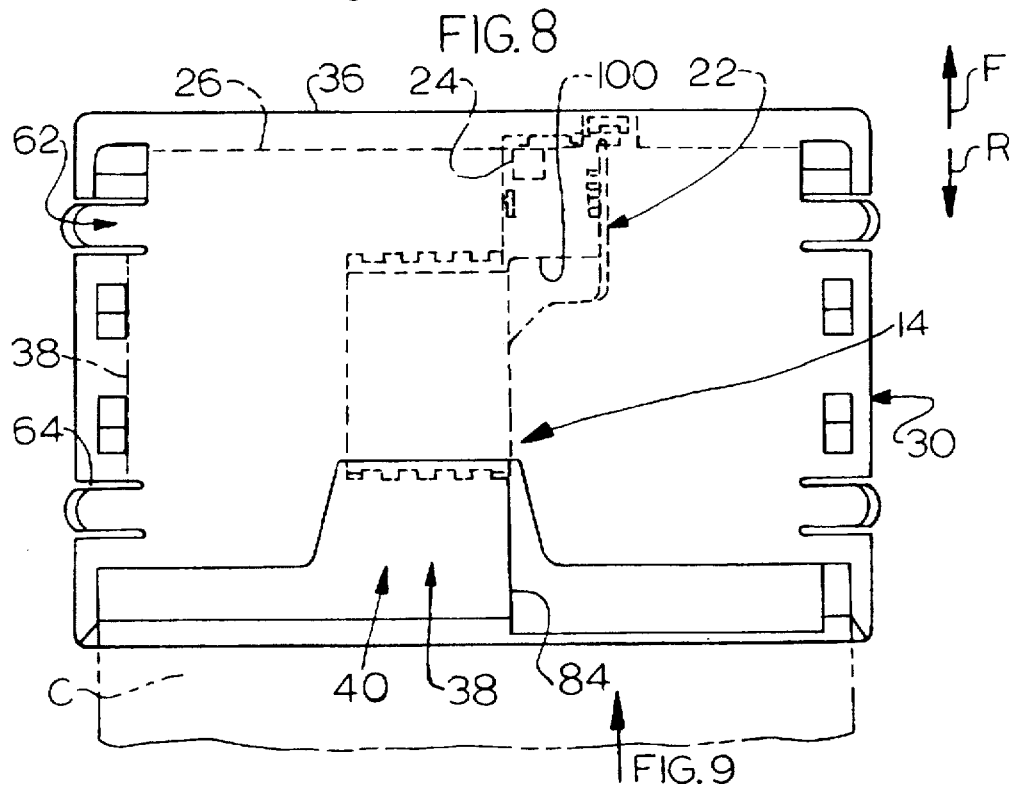

5,775,949

1

COMPACT SMART CARD RECEIVER

BACKGROUND OF THE INVENTION

The present invention relates to an arrangement for the connection of a contact-type integrated circuit card, often referred to as a smart card, in a read/write device. A card is inserted into the arrangement in a rearward direction and guided to a fully-installed card position. The card is guided into position by a molded plastic device, while contacts for engaging pads on the card are held in a connector body. The card-guiding device and the connector are mounted on a circuit board. It is important to assure that the card guiding molded device and the connector are accurately positioned with respect to each other, while avoiding large accumulation of manufacturing and assembly tolerances. A smart card receiver that facilitated accurate card guidance in a low cost construction, would be of value.

SUMMARY OF THE INVENTION

In accordance with the present invention, a smart card receiver is provided for guiding a smart card into a slot for engagement with contacts of a connector. The receiver includes a cover mounted on a circuit board or other support and lying above the connector, the cover being constructed for one-piece molding and for guiding a card to a full insertion position. After the connector is mounted on the circuit board and its contacts are soldered to circuit board traces, the cover is mounted on the circuit board over the connector. The cover is engaged with the connector so the connector can help to accurately position the cover. The connector can be assembled on the circuit board together with other electronic components, and all may be wave soldered or otherwise joined to traces on the circuit board. The cover is separately installed in a mechanical assembly station.

According to other characteristics of the invention, the cover includes a card-guiding floor whose upper face lies substantially flush with the upper face of the connector. The cover has a short front end for guiding the leading edge of a card that is inserted, and has runners on opposite sides for guiding the card along most of the longitudinal length of the card-receiving slot. The lower floor of the cover terminates in a rear edge that overlaps a segment of the connector. The cover has fixing legs that can project into a hole in the circuit board, the legs having hooks at their lower ends for fixing to the board.

The novel features of the invention are set forth with particularity in the appended claims. The invention will be best understood from the following description when read in conjunction with the accompanying drawings.

BRIEF DESCRIPTION OF THE DRAWINGS

FIG. 2 is a top view of the cover of FIG. 1.

FIG. 3 is a sectional view taken on line 3—3 of FIG. 2.

FIG. 4 is a front elevation view of the cover of FIG. 2, as viewed along arrow F4 of FIG. 2.

FIG. 5 is a sectional detailed view taken on line 5—5 of FIG. 2, illustrating the hooking of the cover to a circuit board.

FIG. 6 is a bottom view of the cover of FIG. 2.

FIG. 7 is a sectional view taken on line 7—7 of FIG. 6.

2

FIG. 8 is a view similar to that of FIG. 2, but showing an installed connector in hidden lines.

FIG. 9 and 10 are views similar to those of FIGS. 4 and 6, but showing the cover in association with the connector with FIG. 9 being a view taken along arrow F9 in FIG. 8.

FIG. 11 is a view similar to that of FIG. 7, but taken on a different sectional view of the connector, and also showing the cover end connector mounted on a circuit board.

Figure 12:
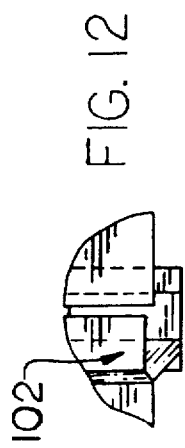

FIG. 12 is a view of the area indicating by arrow F12 of FIG. 6.

Figure 13:
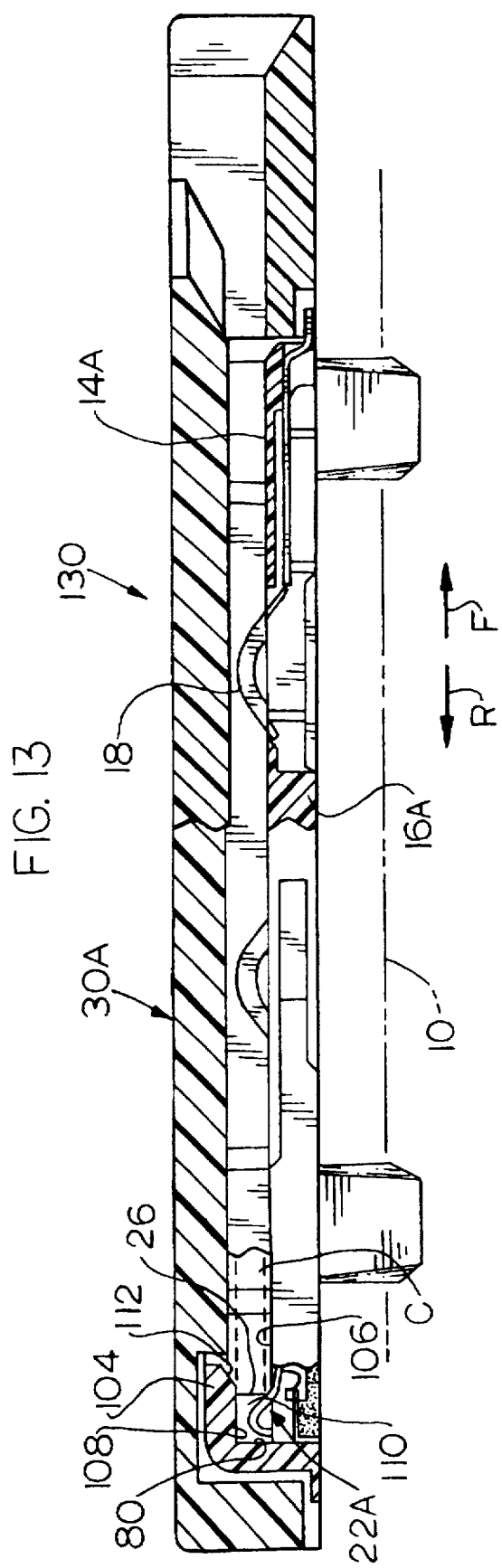

FIG. 13 is a sectional view of another embodiment of the invention, with the view of FIG. 13 being similar to that of FIG. 11.

DESCRIPTION OF THE PREFERRED EMBODIMENTS

Figure 1:
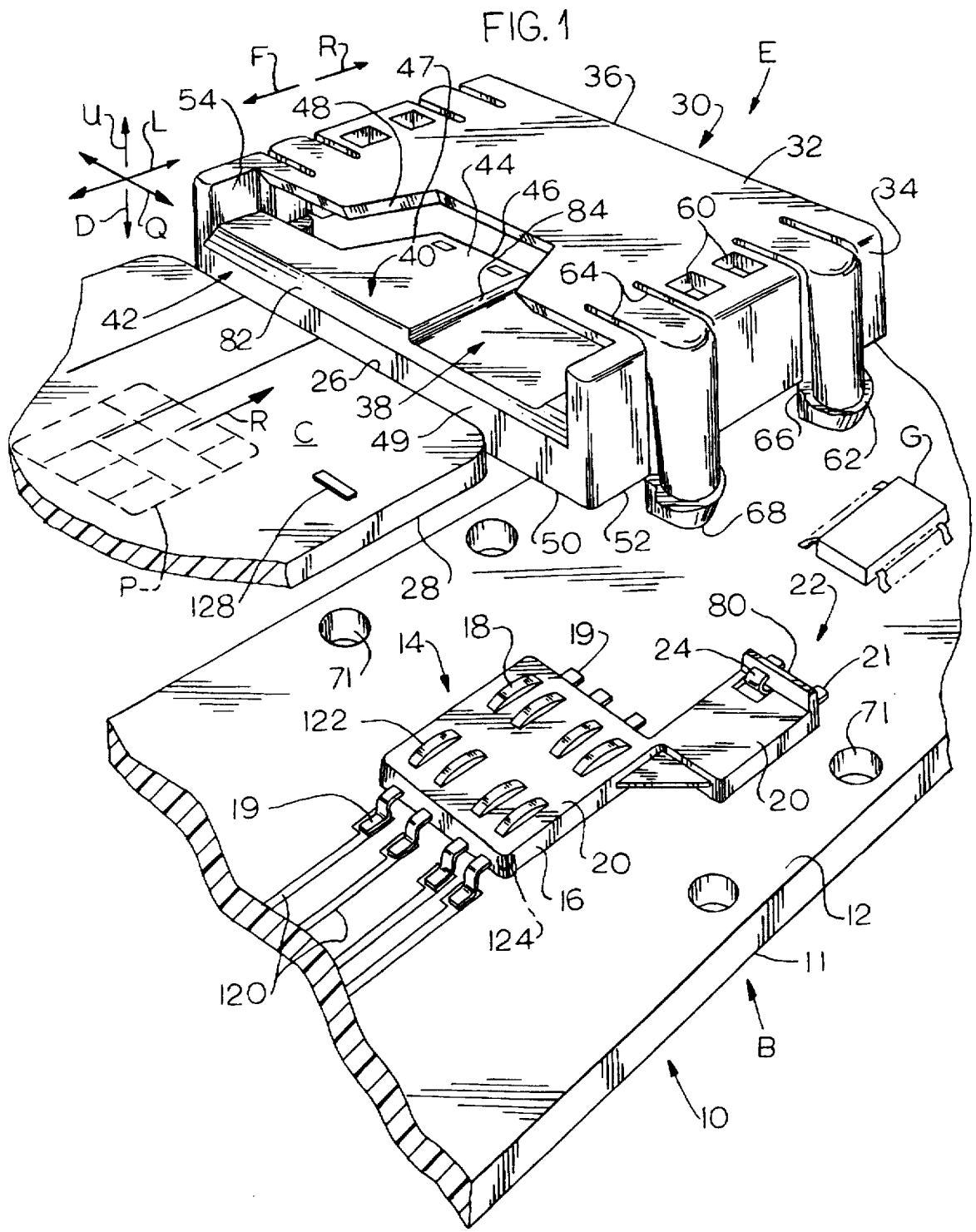
FIG. 1 is an exploded prospective view of a smart card receiver constructed in accordance with the present invention.

FIG. 1 illustrates a read/write device B which includes a printed circuit board 10 and a smart card receiver E of the present invention. The circuit board has electrically conductive traces 120 and is designed to carry electronic components that are connected to the traces, as by the components having leads extending into plated holes in the board that connect to traces or which are surface mounted. The board has upper and lower faces 12, 11. An electrical connector 14 is mounted on the board, the connector having electrical contacts 18 with tails 19 that are surface mounted on the traces. A cover 30 is constructed for mounting on the board, the cover being constructed to receive a smart card C. The cover 30 has a slot 38 with an open front end 42 and lateral wall faces 54. When the smart card is inserted in the rearward direction R through the open front end 42 of the slot in the cover, contact pads P on the lower face 28 of the card are engaged by the contacts 18 of the connector, so electrical currents can pass between the contact pads P, through the contacts 18, and through the traces 120 to other circuitry on or connected to the circuit board. It may be noted that the rearward direction R of card insertion is in a longitudinal direction L which is opposite to a forward longitudinal direction F. These directions are perpendicular to a lateral direction Q and to vertical directions indicated by up and down arrows U, D.

The connector 14 has a body 16 of molded insulative plastic material which carries the contact elements or contacts 18. The contacts are in the form of conductive strips with pad-engaging portions or blades 122 that project up above an upper face 20 of the body. The particular connector includes a switch 22 for detecting the presence of a fully inserted card. The switch includes a control lever 24 that is moved by the rear edge 26 of a card as it achieves a fully inserted card position. When the lever 24 is actuated, it depresses a snap dome which connects two switch contact elements. The switch contact elements have switch contact tails 21 lying opposite the switch rear end (100 in FIG. 8) that are connected to other traces on the circuit board. A single body 16 holds the card-engaging contacts 18 and the contact elements or contacts of the switch 22, with all contacts having middle portions that are fixed in place in the body. The tails 19, 21 are preferably soldered (or even brazed) to the traces. The connector is accurately positioned on the circuit board by studs (124) that fit into holes drilled in the circuit board.

The cover 30 which guides the card C, includes upper and lower walls 32, 40, laterally opposite side walls 34, and a rear panel or wall 36. As shown in FIG. 8, the cover walls form a slot 38 which receives the inserted card. FIG. 11 shows a fully-inserted card position A wherein the rear portion of a card has been fully inserted into the slot 38 of the card receiver. The lower wall or floor 40 of the cover 30 extends longitudinally from the front edge 49 of the receiver, only partially along the slot and the fully inserted card position A. As shown in the bottom view of FIG. 10, the bottom wall 40 of the card has a rear transverse rear edge 46 which has a lateral (Q) width that is less than half the width of the slot 38 or of the fully inserted card position A.

As shown in FIG. 1, in order for the cover 30 to be molded in a single piece, the upper wall 32 includes, at its front, a cutout 48 of a shape complimentary to the contour of the floor 40, including its central part 44. The cutout in the upper wall 32 allows the passage of a core in the molding tool, through the cutout 48, to form the upper surface of the wall 40 including its rear edge 46. The front 49 of the floor 40 has a lower edge 50 which extends in the same plane as the lower edges 52 of the side walls 34. The edges 50, 52 are formed to bear against the upper face 12 of the circuit board when the cover is fixed thereon.

As shown in FIG. 3, the side walls 34 of the cover include complimentary lower and upper runners 56, 58. The runners form lower and upper surfaces of the slot 38. The runners, which guide side portions of the card, are formed to enable molding of the cover in a single operation, with cores extending down through the upper wall 32 (through cutouts 60 therein) forming the lower runners, and with cores extending up through the bottom of the cover forming the upper runners 58.

The cover 30 is fixed to the circuit board 10 by two pairs of legs 62. As shown in FIG. 1, each leg 62 is separated from a corresponding side wall 34 and a portion of the upper wall 32, by a pair of largely parallel slots 64. The slots 64 enables the legs to be resiliently deflected to enter corresponding holes 71 in the circuit board, and facilitate positioning the cover with respect to the connector. The lower end of each leg includes a lug 66 of semi-cylindrical cross section. The vertical lugs 66 terminate in free ends in the shape of hooks at 68. FIG. 5 shows that the length of each leg 66 is such that the hook 68 lies adjacent to the lower face 11 of the circuit board. To ease the insertion of the hooks into the holes in the circuit board, each hook 68 includes a chamfer 70. Thus, the cover is mounted on the circuit board by inserted the hooks at the bottom of the legs 62 into the circuit board holes 71 and then pressing down the cover until the free ends of the legs resiliently engage the board. There is a gap around each leg and between it and the walls of the circuit board hole, and this plus resilience of the legs allows the cover to be shifted into precision alignment with the connector body.

FIG. 11 shows that the cover lower wall 40 has a lower surface 45 spaced from the circuit board 10 and has a rear portion 74 that includes a pair of hooks 72. The body 16 of the connector has a forward end forming a segment 75 that lies at a height below the upper face 20 of the connector body at the front end of the body. The segment 75 forms a depressed rear end 78 that lies under the overhanging rear edge 46 of the cover lower wall 40. The segment 75 is trapped by the pair of hooks 72 formed in the lower wall. Such overlap of the cover lower wall 40 with the connector body 14 helps to assure precise positioning of the cover with respect to the connector. The rear of the connector body includes a lug that can abut the cover to help position the cover. The upper surface 20 of the connector body lies no higher than the upper face 47 of the cover lower wall, to assure that an inserted card does not strike the front end of the body and either be stuck thereat or provide a false indication that the card has been fully inserted. Although the upper face 20 could lie below the cover lower wall 40, applicant prefers that the body upper face 20 lies substantially flush with the upper face 47 of the cover lower wall. Providing substantial flushness enables the provision of a card receiver of minimal height, and assures that the contact blades 122 of the connector contacts will firmly engage the pads on the inserted card, even if there is an accumulation of tolerances that results in the contact blades 122 not extending as high as they were designed to extend. The engagement of the connector segment 75 with the overhanging rear edge 46 and hook 72 also helps to position the cover in lateral and longitudinal directions, which helps to assure that each contact blade 122 will engage an intended contact pad on the card.

The lug 80 at the rear of the connector body helps to position the rear of the connector with respect to the cover. Also, the forward face of the lug 80 determines how far rearward a card can be inserted. Such position of the card rear edge 26 must lie only a small distance rearward of the lever 24 that senses full card insertion. FIG. 6 shows that the rear end (37) of the upper wall 32 of the cover includes a catch 102. The catch resiliently engages the rear end of the connector at the lug 80 (FIG. 11).

Applicant mounts the connector 14 on the circuit board 10, prior to fixing the cover 30 to the board. The connector 14 is mounted by laying the surface mount contact tails 19, 21 against traces on the circuit board and soldering (or brazing) the tails to the traces on the board. This operation is preferably performed when any other surface mount electrical components (e.g. G in FIG. 1) are mounted on the same circuit board. Afterwards, the cover 30 is mounted by inserting the legs into the circuit board holes and pushing down the cover until the legs snap into place. During downward movement of the cover it engages the setback 78 at the front end of the connector body 16 and the lug at the rear end of the body. The cover shifts position to be precisely aligned with the connector, due to the holes in the circuit board being larger than the leg portions lying therein and due to resilience of the legs.

To ease insertion of the card, the front edge of the slot 38 into which the card is inserted, includes a chamfer 82 (FIG. 1) formed all around the slot, and especially on the front edge of the lower wall 40 and on the front edge of the upper wall 32. In many cases, the card C may include projections 128 that projects slightly above or below corresponding faces of the card. Recesses or cavities 84 are provided in the faces of the upper and lower walls of the cover that face the slot to pass such projections.

FIG. 13 illustrates another card receiver 130 which includes a cover 30A and connector 14A of reduced thickness, for mounting on a circuit board 10. The connector 14A includes a switch 22A whose body is integral with the body 16A of the rest of the connector. The switch portion includes a roof 104 that extends partially above the top of the switch. The roof 104 has a lower face 108 forming a housing portion 110 that receives the rear edge 26 of the fully inserted card.

While terms such as "up", "down", "top", "bottom" etc. have been used to aid in describing the invention as illustrated, the invention can be used in any orientation with respect to the Earth.

Thus, the invention provides a moderately low cost and effective smart card receiver for mounting on a circuit board or other similar board. The card receiver includes a connector with contacts for engaging pads on the card and having tails for direct engagement with traces on the circuit board. The card receiver also includes a cover that is preferably a one-piece plastic molded part that is separately mounted on the circuit board, but closely positioned with respect to the connector. The cover has top and bottom walls forming a card-receiving slot between them. The bottom wall has a front portion that extends across the width of the card slot, but that extends forwardly only a small distance, so that most of the area below the card slot is not occupied by the lower wall. Instead, the lower wall forms a large gap where the connector lies. The lower wall preferably has a rear edge that overlies a vertically recessed or setback segment at the front end of the connector, the lower wall also preferably having hooks for engaging lower the connector segment, to thereby precisely fix the position of the cover with respect to the connector. A connector body rear end also can engage the cover. Opposite sides of the slot include runners for guiding sides of the card, with the runners including alternate top and bottom runners with gaps between them, to facilitate one piece molding of the cover. The connector is preferably first attached to the circuit board, with its contact tails soldered to circuit board traces, when other circuit component tails are soldered to traces. The cover is thereafter mounted to the board and precisely positioned by the connector body.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A smart card receiver for receiving a smart card of the type that has upper and lower faces and a plurality of contact pads on one of said faces, and for establishing electrical connection with said contact pads comprising:

a circuit board having upper and lower faces and a plurality of conductive traces;

a one-piece molded plastic cover (30) that lies on said circuit board to lie primarily above said board upper face, said cover forming slot walls of a card-receiving slot (38) that receives a rearwardly-inserted smart card into a fully-installed card position;

an electrical connector (14) which includes a connector body (16) mounted on said circuit board and a plurality of card-engaging contacts mounted on said body, each contact having a tail engaged with one of said traces of said circuit board, and each contact having a card-engaging contact portion positioned to initially lie in said card-receiving slot prior to insertion of the smart card, and to engage the contact pads of the card lying in said card-receiving slot;

said connector body being fixed in position on said circuit board and said cover being shiftable on said circuit board, with said cover engaging and being positioned in at least one direction by said connector body.

2. The card receiver described in claim 1 wherein:

said slot walls of said cover include upper and lower walls and laterally spaced side walls, with said lower wall (40) and said connector body together lying under no more than half the area of said card-receiving slot as seen in a bottom view when said circuit board upper face lies in a horizontal plane, so more than half of the bottom of said slot (8 is open to form an open bottom slot area.

3. The card receiver described in claim 1 wherein:

said cover has opposite sides and a plurality of card guide runners (56, 58) lying at each side of said card-receiving slot and lying at the top and bottom of said card-receiving slot, with said plurality of runners at each side including alternate top and bottom runners which alternate along a rearward direction and with cutouts (60) separating said bottom runners.

4. The card receiver described in claim 1 wherein:

said circuit board has a plurality of board holes (71);

said cover has a plurality of downwardly-projecting legs (62) that each projects through one of said board holes, with said cover having a pair of horizontally extending slits 64) on opposite sides of each leg to allow the leg to deflect slightly.

5. The card receiver described in claim 1 wherein:

said slot walls of said cover include upper and lower walls, and said lower wall of said cover has a rear portion (74) with a bottom that is spaced from said circuit board, while said connector body has a main portion with an upper face (20) and said connector body also has a front end forming a setback (75) with an upper surface lying below an upper face of said body, and under and against said bottom of said rear portion of said cover lower wall.

6. The card receiver described in claim 5 wherein:

said setback has a lower end lying above said circuit board, and said rear portion (74) of said lower wall has a hook (72) that abuts said lower end of said setback.

7. A smart card receiver for receiving a smart card that has a surface holding a plurality of contact pads, comprising:

a circuit board having upper and lower faces and having a plurality of conductive traces;

an electrical connector including a connector body mounted on said circuit board and having a top surface for lying below a fully installed card, said connector having a plurality of electrical contacts held by said body, said contacts having tails connected to said traces on said circuit board and having contact blades that are upwardly biased toward the position of a fully-inserted card to engage the contact pads of the card;

a cover mounted on said circuit board, said cover having top and bottom slot walls (32, 40) forming a portion of a card-receiving slot (38) that receives a smart card inserted in a rearward longitudinal direction to a fully-installed card position, with said cover having a front end and with said top and bottom slot walls forming an entrance at the front of the cover;

said cover having legs (62) that are mounted on said circuit board, with at least said bottom slot wall being shiftable with respect to said circuit board, and with said bottom slot wall having means (46, 75) for engaging said connector body to position said bottom slot wall with respect to said connector body.

8. The smart card receiver described in claim 7 wherein:

said bottom slot wall has a front portion 49 extending laterally (Q) along substantially the entire width of said entrance but that extends rearwardly from the front of said card-receiving slot by a distance that is no more than half of the longitudinal length of said card-receiving slot, said bottom slot wall has a rear portion (74), and most of said connector body lies rearward of said rear edge of said bottom slot wall;

said means for engaging said connector body comprises the bottom slot wall rear portion (74) with said rear portion having an overhanging rear edge (46), with said connector body having a depressed rear end (78) that lies under and abuts said overhanging rear edge.

\* \* \* \* \*